US010633270B2

(12) United States Patent
Wong et al.

(10) Patent No.: US 10,633,270 B2
(45) Date of Patent: Apr. 28, 2020

(54) FILTRATION ENHANCEMENT DEVICE FOR A CIRCULATING WATER CULTURE SYSTEM AND METHOD OF MAKING/MAINTAINING SAME

(71) Applicant: KYORIN INDUSTRY (SHENZHEN) CO., LTD., Shen Zhen (CN)

(72) Inventors: Tommy Chi-Kin Wong, Shen Zhen (CN); Christopher Kenneth Clevers, Shen Zhen (CN); Tin-Han Chien, Shen Zhen (CN)

(73) Assignee: KYORIN INDUSTRY (SHENZHEN) CO., LTD., Shen Zhen (CN)

( * ) Notice: Subject to any disclaimer, the term of this patent is extended or adjusted under 35 U.S.C. 154(b) by 7 days.

(21) Appl. No.: 16/047,370

(22) Filed: Jul. 27, 2018

(65) Prior Publication Data
US 2020/0031699 A1   Jan. 30, 2020

(51) Int. Cl.
C02F 3/34     (2006.01)
A01K 63/04   (2006.01)
C02F 3/30     (2006.01)
C02F 103/20  (2006.01)

(52) U.S. Cl.
CPC ............ *C02F 3/348* (2013.01); *A01K 63/045* (2013.01); *C02F 3/301* (2013.01); *C02F 2103/20* (2013.01)

(58) Field of Classification Search
CPC ......... C02F 3/348; C02F 3/301; A01K 63/045
See application file for complete search history.

(56) References Cited

U.S. PATENT DOCUMENTS

| 4,670,149 A * | 6/1987 | Francis | B01D 17/04 210/150 |
| 4,678,567 A * | 7/1987 | Ueda | C02F 3/06 210/150 |
| 4,810,385 A * | 3/1989 | Hater | C02F 1/688 210/150 |
| 5,011,679 A | 4/1991 | Spanier et al. | |
| 5,770,079 A * | 6/1998 | Haase | C02F 1/685 210/150 |
| 6,428,701 B1 * | 8/2002 | Mullennix | C02F 1/687 210/153 |
| 6,878,279 B2 * | 4/2005 | Davis | C02F 3/101 210/610 |
| 7,381,333 B1 * | 6/2008 | Rainer | C02F 1/286 210/660 |
| 8,545,697 B2 * | 10/2013 | Thorgersen | C02F 1/688 210/170.03 |
| 8,673,150 B2 * | 3/2014 | Pearson | C02F 3/343 210/606 |

(Continued)

FOREIGN PATENT DOCUMENTS

| CN | 101264985 A | 9/2008 |
| CN | 206232700 U | 6/2017 |

*Primary Examiner* — Chester T Barry
(74) *Attorney, Agent, or Firm* — Schwabe Williamson & Wyatt, PC

(57) ABSTRACT

A filter enhancement device applied to a circulating water culture system and the method of making same, the device includes four components: protective shell, protective agents, microbial powder and proliferation promoting agents. The interior of the protective shell contains protective agents, microbial powder and proliferation promoting agents. Microbial powder and proliferation promoting agents are embedded in the modified-release layer.

18 Claims, 5 Drawing Sheets

(56) References Cited

U.S. PATENT DOCUMENTS

Figure 1:
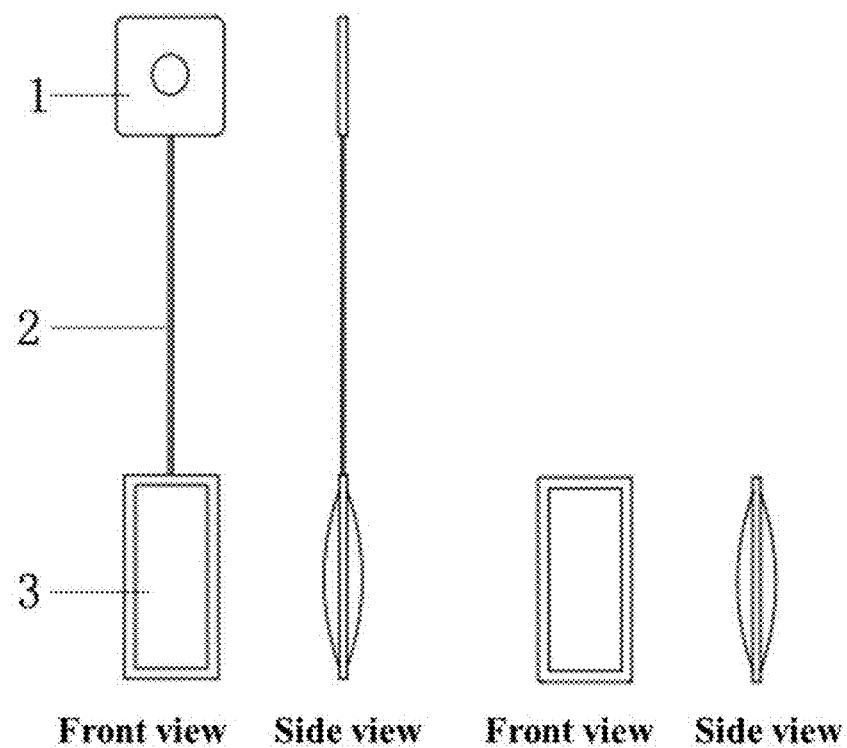
Figure 2:
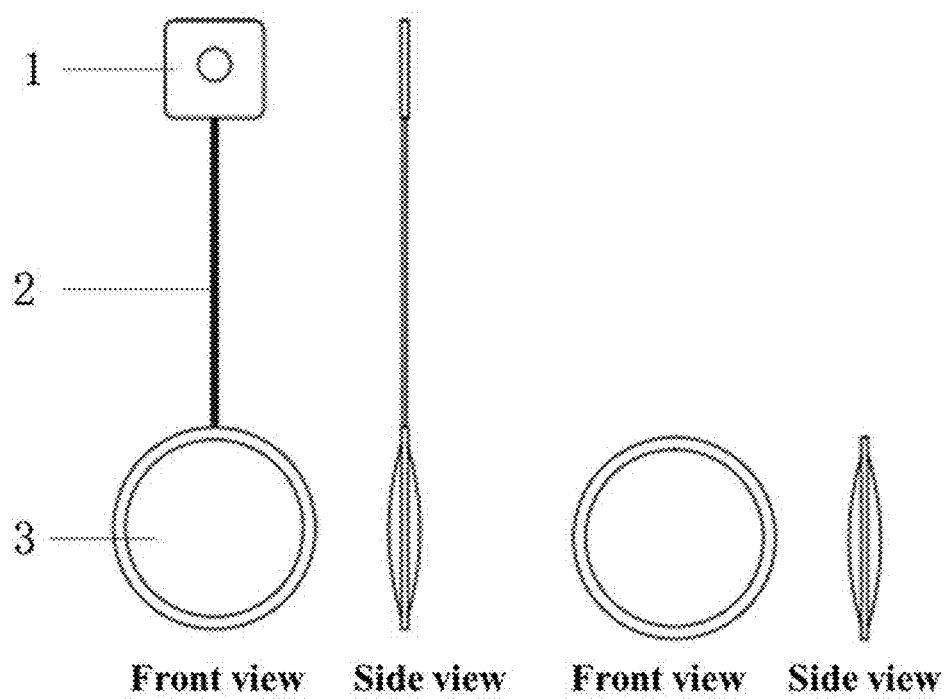
Figure 3:
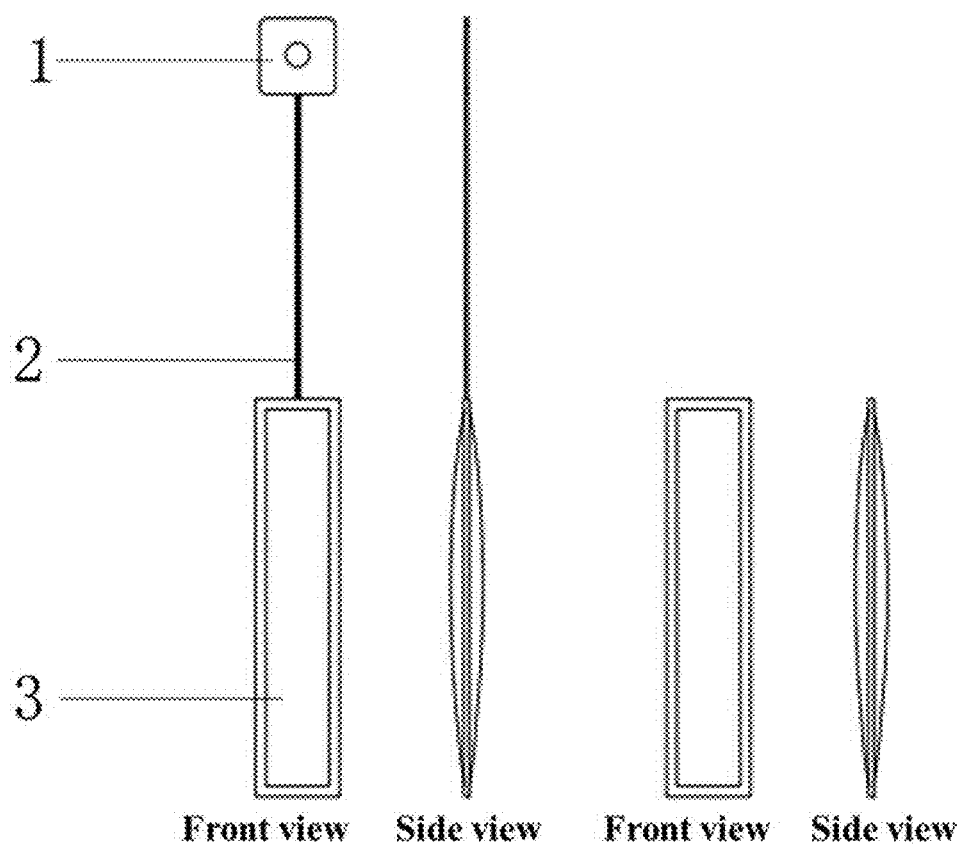
Figure 4:
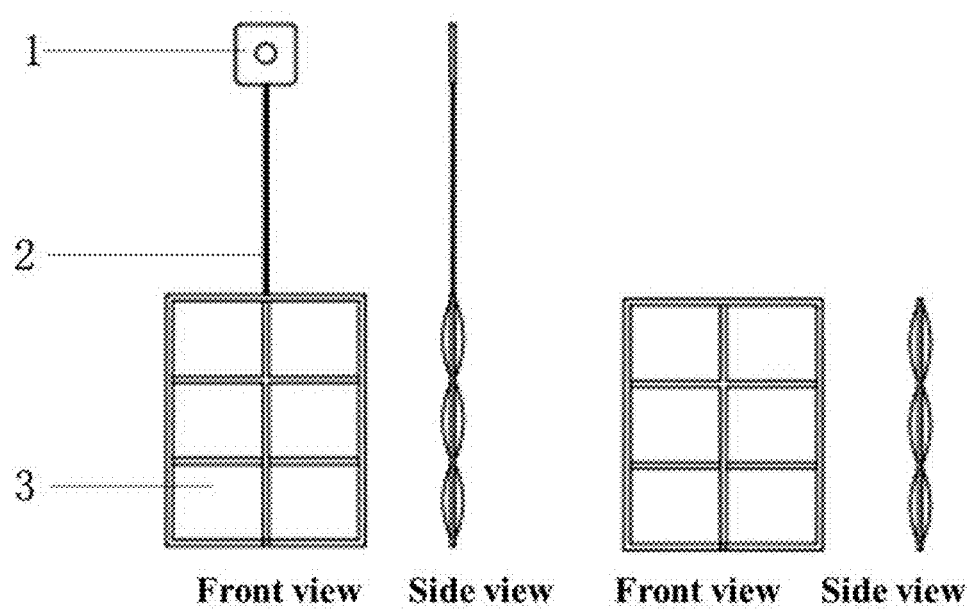
Figure 5:
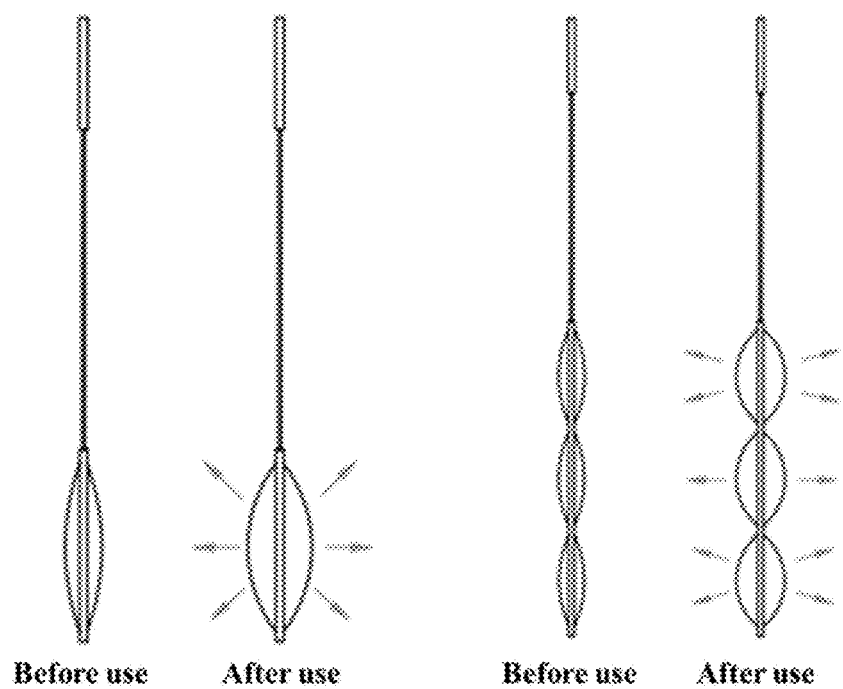
Figure 6:
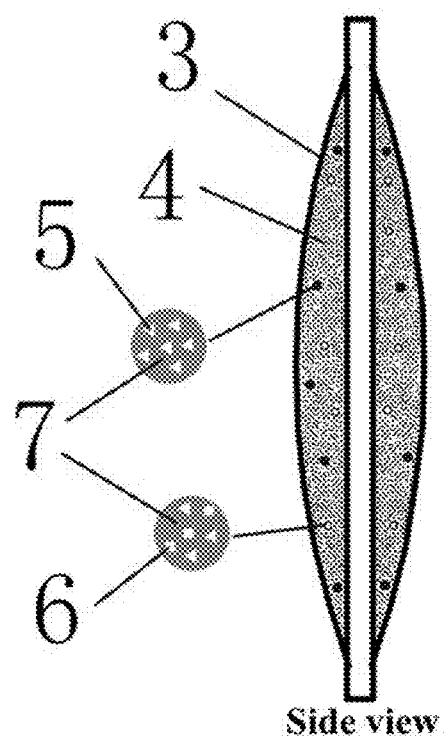
Figure 7:
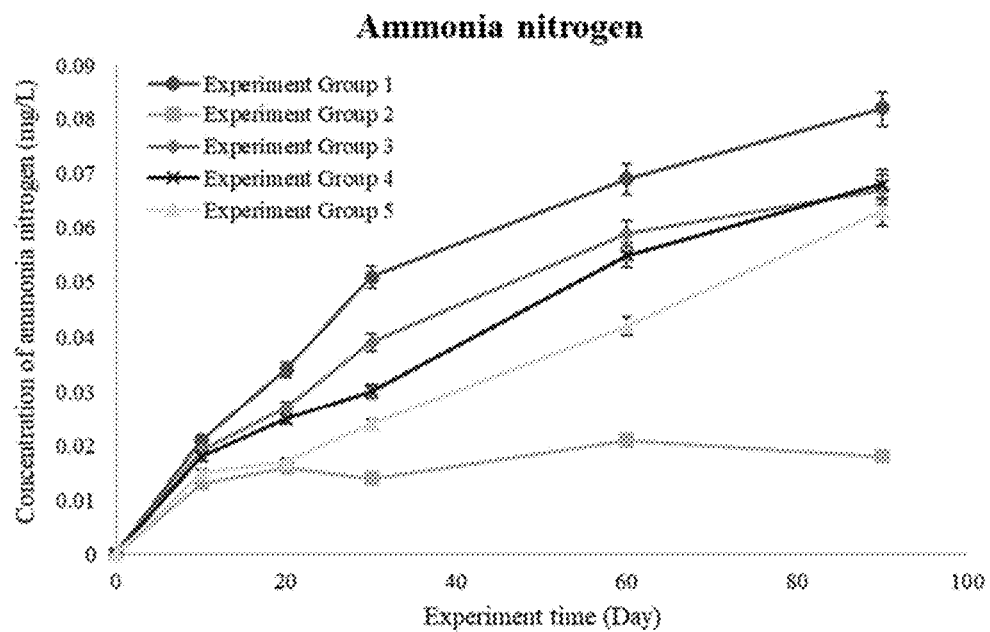
Figure 8:
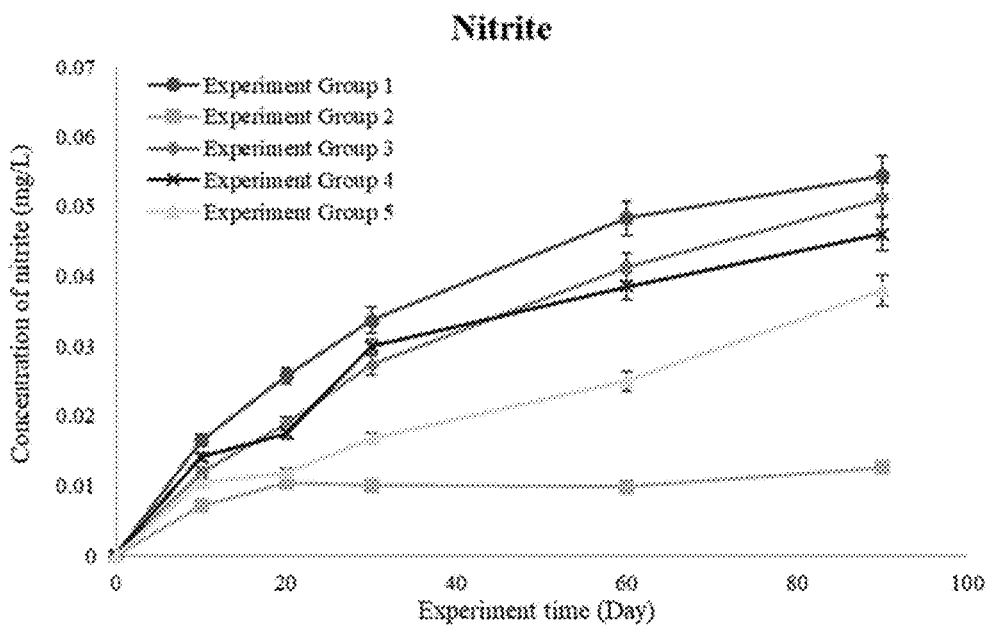
Figure 9:
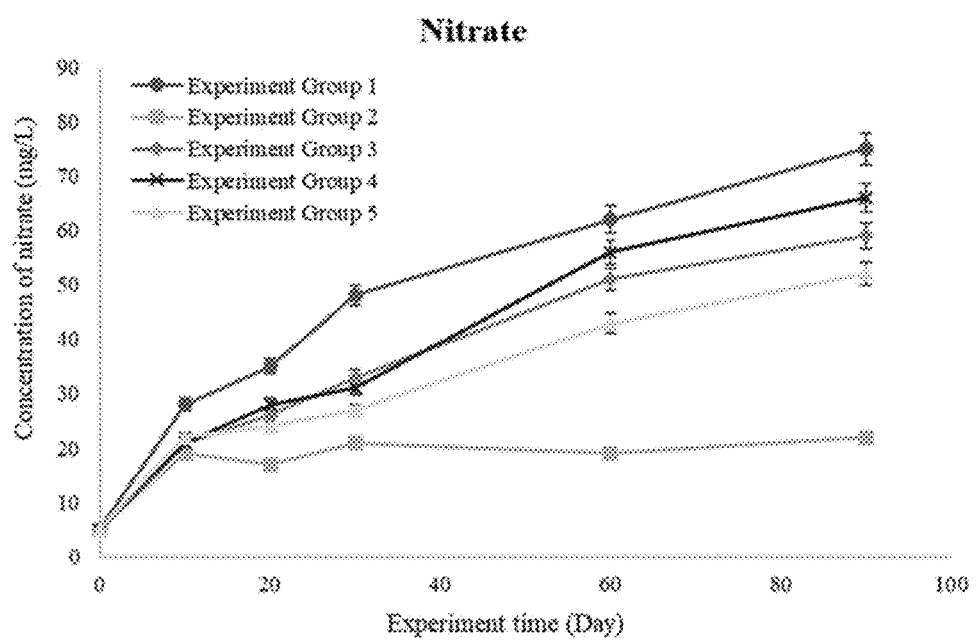

| | | | |
|---|---|---|---|
| 9,540,608 B2* | 1/2017 | Pruitt | C02F 3/348 |
| 9,878,924 B2* | 1/2018 | Beierwaltes | C05G 3/04 |
| 9,975,792 B2* | 5/2018 | Thorgersen | C02F 1/688 |

* cited by examiner

Before use  After use  Before use  After use

Side view

FILTRATION ENHANCEMENT DEVICE FOR A CIRCULATING WATER CULTURE SYSTEM AND METHOD OF MAKING/MAINTAINING SAME

TECHNICAL FIELD

The present disclosure relates to the field of circulating water culture systems, in particular to a filter enhancement device added to a circulating water culture system and the method of making/maintaining same.

BACKGROUND

Keeping pond fish is a very popular aquaculture production in the traditional aquaculture industry. Due to the increasingly lack of land and water resources, the cost of pond aquaculture keeps increasing at a rate in excess of inflation because of the low culture density and ever-declining economic benefits. A circulating water culture system with a filtration device is common practice in today's aquaculture applications. However, while an excessively large circulating water culture system allows higher density and intensive farming opportunities thus providing economic benefits, it also faces many challenges. In the process of adopting higher density farming operations, due to the need for excessive feeding, a large amount of residual feed and animal excrement produces pollutants such as ammonia nitrogen, nitrite and sulfide, which not only pollute the water but also negatively impact cultured animal health. These same problems are also encountered in most recirculating hobbyist ponds and display aquariums around the world.

With reference to water treatment in any recirculating aquaculture system, microorganisms, such as *Bacillus*, nitrifying bacteria, denitrifying bacteria, yeast, *Lactobacillus*, photosynthetic bacteria, are proliferated to degrade excess feed, waste, ammonia nitrogen, nitrite nitrogen, nitrate nitrogen and other organic and inorganic substances. Through the microbial activities of nitrogen fixation, dehydrogenation, carbon fixation and oxidation, the harmful substances in the water are transformed via the nitrogen cycle, significantly reducing the amount of ammonia nitrogen and nitrite as well as chemical oxygen demand (COD) of the water while working to stabilize the pH.

Most microorganisms induced to aid aquaculture water purification are directly sprayed or added, via liquid or powder form, to the water. However, these types of products offer no protection for the microorganisms, leaving the microbial cells to be flushed away by water flow, which leads to random and unpredictable growth of microbial cells on the filters or in the water. The desired and necessary benefit to help maintain the needed water quality thereby becomes unlikely due to the lack of microbial colonization at a specific location and as the microorganism colonies degrade over time the water filtration system loses efficiency and effectiveness. In addition, the nutrients contained in the prior art are not fully protected, some even completely exposed in the water. During the utilization of these products, harmful bacteria such as *Escherichia coli*, Vibrio have ready access to nutrients in the water column, eliminating the needed nutrients before the activation of sufficient colonies of microorganisms necessary for effective and efficient water purification, and thus results in an adverse proliferation of harmful microorganisms. Moreover, agents added to the microbial products such as calcium carbonate, zeolite powder, ceramsite, bentonite, diatomaceous earth, porous clay, porous volcanic rock and zeolite cannot be recycled, which causes secondary pollution of the water.

CN pat. No. 101264985B to Guo et al. discloses a sustained-release water treatment microorganism. Though the pores of natural ore particles provide the microorganisms and nutrients breeding grounds to attach and have certain sustained-release ability, the microorganisms are still flushed and diluted by water flow due to the absence of protection of the microorganisms. As long as the beneficial bacteria cannot form predominant bacterial flora, the aforementioned disadvantages cannot be overcome. CN pat. No. 206232700U to Lv et al. discloses a microorganism device having long-acting and slow-release properties for sewage treatment. However, there is no protection for the core of the device; furthermore, the microporous filter is a hollow cylinder open at both ends, which renders the internal core of the device negatively impacted by water flow and by bringing harmful bacteria into it, snatching and utilizing the nutrients required for beneficial bacteria. The beneficial bacteria are therefore not able to form predominant bacterial flora. Therefore, it is of great significance to provide a method for microorganisms, used for water purification, to colonize in a specific position, especially inside a filter, in a recirculating aquaculture system, so as to enhance the effectiveness of the filter.

SUMMARY

Briefly, the present disclosure is intended to overcome the aforementioned disadvantages of the prior art by providing a filtration enhancement device for use in a circulating water culture system and method of making same.

The technical scheme adopted by the disclosure is as follows:

A filtration enhancement device in a circulating water culture system comprises the following components: protective shell, protective agents, microbial powder and proliferation promoting agents.

Specifically, the microbial powder and proliferation promoting agents are mixed thoroughly according to mass ratio of 1:1~10000, producing microbial powder mixture; wherein the microbial powder mixture is embedded in timed-release layers of different thickness according to expected release time, wherein the timed-release layer contains one or more layers, and the thickness of each layer is 1 to 1000 μm.

Specifically, the proliferation promoting agents are embedded in timed-release layers of different thickness, the timed-release layer contains one or more layers, and the thickness of each layer is 1 to 1000 μm.

Specifically, the embedded microbial powder mixture and proliferation promoting agents are added to the protective shell containing protective agents, according to the mass ratio of 1:1-10, producing the filtration enhancement device in a circulating water culture system.

A method for preparing a filtration enhancement device in a circulating water culture system, such as the one mentioned above, comprises the below steps:

1) Mix the microbial powder and proliferation promoting agents thoroughly using a mass ratio of 1:1~10000, producing a microbial powder mixture.

2) Embed the microbial powder mixture from step 1) and in the timed-release layers of different thicknesses according to the anticipated release time. The timed-release layer contains one or more layers, and the thickness of each layer is 1 to 1000 μm.

3) Embed the proliferation promoting agents in the timed-release layers of different thickness. The timed-release layer contains one or more layers, and the thickness of each layer is 1 to 1000 μm.

4) Add the embedded microbial powder mixture and proliferation promoting agents from step 2) and 3) according to the mass ratio of 1:1-10 to the protective shell containing protective agents, producing the filtration enhancement device for a circulating water culture system.

Advantageously, the microbial powder and proliferation promoting agents are mixed according to the mass ratio of 1:100.

Advantageously, the protective agents are close to the interior of the protective shell with the thickness range from 2 to 2000 μm.

Advantageously, the protective agents are close to the interior of the protective shell with the thickness of 200 μm.

Advantageously, the microbial powder is made of any aerobic bacteria, facultative anaerobic bacteria or anaerobic bacteria.

Advantageously, the protective agents include but are not limited to sodium carboxymethyl cellulose, xanthan gum, shellac gum, sodium alginate, maltodextrin, starch and soy protein.

Advantageously, the materials of the protective shell include but are not limited to filtering papers, fabrics and mesh filters.

Advantageously, the proliferation promoting agents include but are not limited to skim milk, lactose, yeast extract, peptone, maltose, glucose, xylooligosaccharides and fructooligosaccharides.

Advantageously, materials used in the timed-release layer include but are not limited to sodium carboxymethylcellulose, xanthan gum, shellac gum, sodium alginate, maltodextrin, modified starch.

Advantageously, the device contains a fixing component hole that can be affixed or suspended to a specific location in the recirculating aquaculture system with self-adhesives.

Any filtration device applied in circulating aquaculture with a filtration enhancement device of the present disclosure in it.

Advantageously, the composition of microbial powder of the filtration enhancement device can be adjusted according to the locations of deployment. The aerobic bacteria are the main components in the anterior segments of the filter; the facultative anaerobic bacteria are the main components in the middle segments of the filter; the anaerobic bacteria are the main components in the posterior segments of the filter.

The improved beneficial effects of the present disclosure are as follows:

1. The filtration enhancement device in a circulating water culture system is fixable, and can be adjusted based on the characteristics of and the different locations of the filter. The device containing mainly aerobic bacteria are placed in the anterior segments of the filter; the device containing mainly facultative anaerobic bacteria are placed in the middle segments of the filter; the device containing mainly anaerobic bacteria are placed in the posterior segments of the filter. Therefore, the purification effect of the filter in the circulating water culture system is significantly enhanced.

2. Because of the flexible property of the protective shell, the water flow through it can be controlled, causing water to more slowly penetrate into the interior. The protective agents become fully hydrated according to the setting time. As a result, the internal microbial powder and the proliferation promoting agents are well protected in the device.

3. The presence of the protecting agents prevent the microbial powder and proliferation promoting agents from being flushed away and eliminate the chance of harmful bacteria consuming the necessary nutrients, which guarantees rapid growth of beneficial microorganisms after activation and increases the number of beneficial bacteria colonizing within the filter, directly enhancing the water treatment capacity of the filter.

4. Through the timed-release layer, the bacterial can be released at a predetermined period of time. This design helps maintain a high concentration of bacteria over a longer term, with this effect sustained for up to six months. In addition, the proliferation promoting agents alone are embedded in the modified-release layer, which provides nutrients after the microorganisms are released and activated. The nutrients promote growth and proliferation of the beneficial bacteria, helping them maintain a high concentration, and assisting them to colonize in specific locations within the filter.

5. The present disclosure of filtration enhancement device in a circulating water culture system can easily be replaced with a new one, the prior one being recycled, which not only helps eliminate secondary pollution of the water, but also allows the user to experience highly effective and efficient ongoing water purification.

BRIEF DESCRIPTION OF THE DRAWINGS

FIGS. 1 to 4 are various product diagrams of the filtration enhancement device in a circulating water culture system of the present disclosure. 1 is a fixing component, 2 is an extension cord and 3 is a protective shell;

FIG. 5 is a comparison diagram of the filtration enhancement device in a circulating water culture system of the present disclosure before and after use;

FIG. 6 is a diagram of each component in the filtration enhancement device in a circulating water culture system of the present disclosure. 3 is a protective shell, 4 (small black dot) is protective agents, 5 (triangle) is proliferation promoting agents, 6 (square) is microbial powder, and 7 (grey) is timed-release layer.

FIG. 7 is the concentrations of ammonia nitrogen change during experiment;

FIG. 8 is the concentrations of nitrite change during experiment;

FIG. 9 is the concentrations of nitrate change during experiment.

DESCRIPTION OF EMBODIMENTS

The following embodiments made from the above-stated materials, unless otherwise specified, are produced with conventional techniques and methods in the related fields. According to the described manufacturing techniques of the disclosure, further expansion of the production scale is feasible if combined with the basic knowledge of the related fields.

Embodiment 1

The filtration enhancement device applied to a recirculating aquaculture system includes four components: protective shell, protective agents, microbial powder, and proliferation promoting agents.

Specifically, the microbial powder and proliferation promoting agents are mixed thoroughly according to mass ratio of 1:1~10000, producing microbial powder mixture; wherein the microbial powder mixture is embedded in timed-release layers of different thickness according to expected release time, wherein the timed-release layer contains one or more layers, and the thickness of each layer is 1 to 1000 μm;

Specifically, the proliferation promoting agents are embedded in timed-release layers of different thickness, the timed-release layer contains one or more layers, and the thickness of each layer is 1 to 1000 μm;

Specifically, the embedded microbial powder mixture and proliferation promoting agents are added to the protective shell containing protective agents, according to the mass ratio of 1:1-10, producing the filtration enhancement device in a circulating water culture system.

The protective shell comprises a shell.

The filtration enhancement device may further comprises an extension cord attached to the protective shell, and a fixing component attached to the extension cord.

The protective shell is made of filtering papers.

The fixing component contains a hole and self-adhesives.

The protective agents are sodium carboxymethyl cellulose and xanthan gum.

The microbial powder includes the *Bacillus*, the *Actinomyces*, nitrifying bacteria, nitrosated bacteria, lactic acid bacteria, photosynthetic bacteria and denitrifying bacteria.

The proliferation promoting agents are skim milk and lactose.

The timed-release layer is made of shellac gum and sodium alginate.

The method for preparing the above-stated filtration enhancement device in a circulating water culture system comprises the below steps:

1) Mix thoroughly the microbial powder of the *Bacillus*, the Actinomycetes, nitrifying bacteria, nitrosated bacteria, producing aerobic composite microbial powder; mix thoroughly the microbial powder of lactic acid bacteria, producing facultative anaerobic composite microbial powder; mix thoroughly the microbial powder of photosynthetic bacteria and denitrifying bacteria, producing anaerobic composite microbial powder bacteria.

2) Mix the proliferation promoting agents (skim milk and lactose in a mass ration of 1:1) thoroughly and respectively with the composite microbial powder characterizing in aerobic bacteria, facultative anaerobic bacteria or anaerobic bacteria.

3) Divide the mixture from step 2) and the proliferation promoting agents alone into three portions respectively, and sequentially embed in shellac gum and sodium alginate. There are three embedding timed-release layers, the thicknesses of which are 3 μm, 30 μm and 300 μm respectively, producing respectively aerobic composite microbial agents, facultative anaerobic composite microbial agents, anaerobic composite microbial agents and proliferation promoting agents with modified-release property.

4) Add the composite microbial agents and proliferation promoting agents from step 3) to the protective shell containing protective agents (shellac gum and sodium alginate in a mass ration of 1:1), producing the filtration enhancement device in a circulating water culture system characterizing in aerobic bacteria, facultative anaerobic bacteria or anaerobic bacteria.

5) Fix the filtration enhancement device characterizing in aerobic bacteria, facultative anaerobic bacteria or anaerobic bacteria to their corresponding locations according to the internal circumstance of the filter in circulating water culture system.

Embodiment 2

The filtration enhancement device applied to a recirculating aquaculture system includes four components: protective shell, protective agents, microbial powder, and proliferation promoting agents.

The protective shell comprises a shell, an extension cord is attached to the protective shell, and a fixing component is attached to the extension cord.

The protective shell is made of fabrics.

The fixing component contains a hole and self-adhesives.

The protective agents are shellac gum and sodium alginate.

The microbial powder includes the *Actinomyces*, yeast, nitrifying bacteria, nitrosated bacteria, lactic acid bacteria and photosynthetic bacteria.

The proliferation promoting agents are yeast extract and peptone.

The timed-release layer is made of maltodextrin and modified starch.

The method for preparing the above-stated filtration enhancement device in a circulating water culture system comprises the below steps:

1) Mix thoroughly the microbial powder of the *Bacillus*, the Actinomycetes, yeasts, nitrifying bacteria, nitrosated bacteria, producing aerobic composite microbial powder; mix thoroughly the microbial powder of lactic acid bacteria, producing facultative anaerobic composite microbial powder; mix thoroughly the microbial powder of photosynthetic bacteria, producing anaerobic composite microbial powder bacteria.

2) Mix the proliferation promoting agents (yeast extract and peptone in a mass ration of 1:1) thoroughly and respectively with the composite microbial powder characterizing in aerobic bacteria, facultative anaerobic bacteria or anaerobic bacteria.

3) Divide the mixture from step 2) and the proliferation promoting agents alone into three portions respectively, and sequentially embed in maltodextrin and modified starch. There are three embedding layers, the thicknesses of which are 2 μm, 30 μm and 250 μm respectively, producing respectively aerobic composite microbial agents, facultative anaerobic composite microbial agents, anaerobic composite microbial agents and proliferation promoting agents with modified-release property 4) Add the composite microbial agents and proliferation promoting agents from step 3) to the protective shell containing protective agents (shellac gum and sodium alginate in a mass ration of 1:1), producing the filtration enhancement device in circulating water culture system characterizing in aerobic bacteria, facultative anaerobic bacteria or anaerobic bacteria.

5) Fix the filtration enhancement device characterizing in aerobic bacteria, facultative anaerobic bacteria or anaerobic bacteria to their corresponding locations according to the internal circumstance of the filter in circulating water culture system.

Embodiment 3

The filtration enhancement device applied to recirculating aquaculture system includes four components: protective shell, protective agents, microbial powder, and proliferation promoting agents.

The protective shell comprises a shell, an extension cord is attached to the protective shell, and a fixing component is attached to the extension cord.

The protective shell is made of mesh filters.

The fixing component contains a hole.

The protective agents are maltodextrin and starch.

The microbial powder includes the *Bacillus*, yeasts, nitrifying bacteria, nitrification bacteria, lactic acid bacteria, photosynthetic bacteria and denitrifying bacteria.

The proliferation promoting agents are maltose and glucose.

The timed-release layer is made of magnesium stearate and sodium carboxymethyl cellulose.

The method for preparing the above-stated filtration enhancement device in circulating water culture system comprises the below steps:

1) Mix thoroughly the microbial powder of the *Bacillus*, nitrifying bacteria and nitrosated bacteria, producing aerobic composite microbial powder; mix thoroughly the microbial powder of lactic acid bacteria, producing facultative anaerobic composite microbial powder; mix thoroughly the microbial powder of photosynthetic bacteria and denitrifying bacteria, producing anaerobic composite microbial powder bacteria.

2) Mix the proliferation promoting agents (maltose and glucose in a mass ration of 1:1) thoroughly and respectively with the composite microbial powder characterizing in aerobic bacteria, facultative anaerobic bacteria or anaerobic bacteria.

3) Divide the mixture from step 2) and the proliferation promoting agents alone into three portions respectively, and sequentially embed in magnesium stearate and sodium carboxymethyl cellulose. There are three embedding layers, the thicknesses of which are 2 μm, 40 μm and 200 μm respectively, producing respectively aerobic composite microbial agents, facultative anaerobic composite microbial agents, anaerobic composite microbial agents and proliferation promoting agents with modified-release property 4) Add the composite microbial agents and proliferation promoting agents from step 3) to the protective shell containing protective agents (maltodextrin and starch in a mass ration of 1:1), producing the filtration enhancement device in circulating water culture system characterizing in aerobic bacteria, facultative anaerobic bacteria or anaerobic bacteria.

5) Fix the filtration enhancement device characterizing in aerobic bacteria, facultative anaerobic bacteria or anaerobic bacteria to their corresponding locations according to the internal circumstance of the filter in circulating water culture system.

Embodiment 4

The filtration enhancement device applied to recirculating aquaculture system includes four components: protective shell, protective agents, microbial powder, and proliferation promoting agents.

The protective shell comprises a shell, an extension cord is attached to the protective shell, and a fixing component is attached to the extension cord.

The protective shell is made of filtering papers.

The fixing component contains a hole and self-adhesives.

The protective agents are soy protein and sodium alginate.

The microbial powder includes the *Bacillus*, nitrifying bacteria, nitrosated bacteria, lactic acid bacteria, photosynthetic bacteria and denitrifying bacteria.

The proliferation promoting agents are xylooligosaccharides and fructooligosaccharides.

The timed-release layer is made of xanthan gum and shellac gum.

The method for preparing the above-stated filtration enhancement device in circulating water culture system comprises the below steps:

1) Mix thoroughly the microbial powder of the *Bacillus*, nitrifying bacteria and nitrosated bacteria, producing aerobic composite microbial powder; mix thoroughly the microbial powder of lactic acid bacteria, producing facultative anaerobic composite microbial powder; mix thoroughly the microbial powder of photosynthetic bacteria and denitrifying bacteria, producing anaerobic composite microbial powder bacteria.

2) Mix the proliferation promoting agents (xylooligosaccharides and fructooligosaccharides in a mass ration of 1:1) thoroughly and respectively with the composite microbial powder characterizing in aerobic bacteria, facultative anaerobic bacteria or anaerobic bacteria.

3) Divide the mixture from step 2) and the proliferation promoting agents alone into three portions respectively, and sequentially embed in xanthan gum and shellac gum. There are three embedding layers, the thicknesses of which are 1 μm, 30 μm and 300 μm respectively, producing respectively aerobic composite microbial agents, facultative anaerobic composite microbial agents, anaerobic composite microbial agents and proliferation promoting agents with modified-release property 4) Add the composite microbial agents and proliferation promoting agents from step 3) to the protective shell containing protective agents (soy protein and sodium alginate in a mass ration of 1:1), producing the filtration enhancement device in a circulating water culture system characterizing in aerobic bacteria, facultative anaerobic bacteria or anaerobic bacteria.

5) Fix the filtration enhancement device characterizing in aerobic bacteria, facultative anaerobic bacteria or anaerobic bacteria to their corresponding locations according to the internal circumstance of the filter in circulating water culture system.

Embodiment 5

The filtration enhancement device applied to recirculating aquaculture system includes four components: protective shell, protective agents, microbial powder, and proliferation promoting agents.

The protective shell comprises a shell, an extension cord is attached to the protective shell, and a fixing component is attached to the extension cord.

The protective shell is made of fabrics

The fixing component contains a hole and self-adhesives.

The protective agents are sodium carboxymethyl cellulose and shellac gum.

The microbial powder includes the *Actinomyces*, nitrifying bacteria, nitrosated bacteria, lactic acid bacteria and denitrifying bacteria.

The proliferation promoting agents are skim milk and yeast extract.

The timed-release layer is made of sodium alginate, maltodextrin and modified starch.

The method for preparing the above-stated filtration enhancement device in circulating water culture system comprises the below steps:

1) Mix thoroughly the microbial powder of the Actinomycetes, nitrifying bacteria and nitrosated bacteria, producing aerobic composite microbial powder; mix thoroughly the microbial powder of lactic acid bacteria, producing facultative anaerobic composite microbial powder; mix thoroughly the microbial powder of denitrifying bacteria, producing anaerobic composite microbial powder bacteria.

2) Mix the proliferation promoting agents (skim milk and yeast extract in a mass ration of 1:1) thoroughly and respectively with the composite microbial powder characterizing in aerobic bacteria, facultative anaerobic bacteria or anaerobic bacteria.

3) Divide the mixture from step 2) and the proliferation promoting agents alone into two portions respectively, and sequentially embed in shellac gum and sodium alginate. There are two embedding layers, the thicknesses of which are 10 μm and 100 μm respectively, producing respectively aerobic composite microbial agents, facultative anaerobic composite microbial agents, anaerobic composite microbial agents and proliferation promoting agents with modified-release property 4) Add the composite microbial agents and proliferation promoting agents from step 3) to the protective shell containing protective agents (sodium carboxymethyl cellulose and shellac gum in a mass ration of 1:1), producing the filtration enhancement device in a circulating water culture system characterizing in aerobic bacteria, facultative anaerobic bacteria or anaerobic bacteria.

5) Fix the filtration enhancement device characterizing in aerobic bacteria, facultative anaerobic bacteria or anaerobic bacteria to their corresponding locations according to the internal circumstance of the filter in circulating water culture system.

Embodiment 6

The filtration enhancement device applied to a recirculating aquaculture system includes four components: protective shell, protective agents, microbial powder, and proliferation promoting agents.

The protective shell comprises a shell, an extension cord is attached to the protective shell, and a fixing component is attached to the extension cord.

The protective shell is made of mesh filters.

The fixing component contains a hole.

The protective agents are xanthan gum and sodium alginate.

The microbial powder includes yeast, nitrifying bacteria, nitrosated bacteria, lactic acid bacteria and denitrifying bacteria.

The proliferation promoting agents are maltose and xylooligosaccharides.

The timed-release layer is made of magnesium stearate, sodium carboxymethyl cellulose and shellac gum.

The method for preparing the above-stated filtration enhancement device in circulating water culture system comprises the below steps:

1) Mix thoroughly the microbial powder of yeast, nitrifying bacteria and nitrosated bacteria, producing aerobic composite microbial powder; mix thoroughly the microbial powder of lactic acid bacteria, producing facultative anaerobic composite microbial powder; mix thoroughly the microbial powder of denitrifying bacteria, producing anaerobic composite microbial powder bacteria.

2) Mix the proliferation promoting agents (maltose and xylooligosaccharides in a mass ration of 1:1) thoroughly and respectively with the composite microbial powder characterizing in aerobic bacteria, facultative anaerobic bacteria or anaerobic bacteria.

3) Divide the mixture from step 2) and the proliferation promoting agents alone into four portions respectively, and sequentially embed in magnesium stearate, sodium carboxymethylcellulose and shellac gum. There are four embedding layers, the thicknesses of which are 2 μm, 30 μm, 100 μm and 200 μm respectively, producing respectively aerobic composite microbial agents, facultative anaerobic composite microbial agents, anaerobic composite microbial agents and proliferation promoting agents with modified-release property 4) Add the composite microbial agents and proliferation promoting agents from step 3) to the protective shell containing protective agents (xanthan gum and sodium alginate in a mass ration of 1:1), producing the filtration enhancement device in a circulating water culture system characterizing in aerobic bacteria, facultative anaerobic bacteria or anaerobic bacteria.

5) Fix the filtration enhancement device characterizing in aerobic bacteria, facultative anaerobic bacteria or anaerobic bacteria to their corresponding locations according to the internal circumstance of the filter in circulating water culture system.

Embodiment 7

The filtration enhancement device applied to a recirculating aquaculture system includes four components: protective shell, protective agents, microbial powder, and proliferation promoting agents.

The protective shell comprises a shell, an extension cord is attached to the protective shell, and a fixing component is attached to the extension cord.

The protective shell is made of filtering papers.

The fixing component contains a hole.

The protective agents are maltodextrin and soy protein.

The microbial powder includes the *Bacillus*, the *Actinomyces*, nitrifying bacteria, nitrosated bacteria, lactic acid bacteria and denitrifying bacteria.

The proliferation promoting agents are lactose and peptone.

The timed-release layer is made of xanthan gum and sodium alginate.

The method for preparing the above-stated filtration enhancement device in circulating water culture system comprises the below steps:

1) Mix thoroughly the microbial powder of the *Bacillus*, the Actinomycetes, nitrifying bacteria, nitrosated bacteria, producing aerobic composite microbial powder; mix thoroughly the microbial powder of lactic acid bacteria, producing facultative anaerobic composite microbial powder; mix thoroughly the microbial powder of denitrifying bacteria, producing anaerobic composite microbial powder bacteria.

2) Mix the proliferation promoting agents (lactose and peptone in a mass ration of 1:1) thoroughly and respectively with the composite microbial powder characterizing in aerobic bacteria, facultative anaerobic bacteria or anaerobic bacteria.

3) Divide the mixture from step 2) and the proliferation promoting agents alone into two portions respectively, and sequentially embed in xanthan gum and sodium alginate. There are two embedding layers, the thicknesses of which are 10 μm and 200 μm respectively, producing respectively aerobic composite microbial agents, facultative anaerobic composite microbial agents, anaerobic composite microbial agents and proliferation promoting agents with modified-release property 4) Add the composite microbial agents and proliferation promoting agents from step 3) to the protective shell containing protective agents (maltodextrin and soy protein in a mass ration of 1:1), producing the filtration enhancement device in a circulating water culture system characterizing in aerobic bacteria, facultative anaerobic bacteria or anaerobic bacteria.

5) Fix the filtration enhancement device characterizing in aerobic bacteria, facultative anaerobic bacteria or anaerobic bacteria to their corresponding locations according to the internal circumstance of the filter in circulating water culture system.

Embodiment 8

The filtration enhancement device applied to a recirculating aquaculture system includes four components: protective shell, protective agents, microbial powder, and proliferation promoting agents.

The protective shell comprises a shell, an extension cord is attached to the protective shell, and a fixing component is attached to the extension cord.

The protective shell is made of fabrics.

The fixing component contains a hole and self-adhesives.

The protective agents are starch and sodium alginate.

The microbial powder includes the *Bacillus*, the *Actinomyces*, yeast, nitrifying bacteria, nitrosated bacteria, lactic acid bacteria and photosynthetic bacteria.

The proliferation promoting agents are glucose and fructooligosaccharides.

The timed-release layer is made of shellac gum and maltodextrin.

The method for preparing the above-stated filtration enhancement device in circulating water culture system comprises the below steps:

1) Mix thoroughly the microbial powder of the *Bacillus*, the Actinomycetes, yeasts, nitrifying bacteria, nitrosated bacteria, producing aerobic composite microbial powder; mix thoroughly the microbial powder of lactic acid bacteria, producing facultative anaerobic composite microbial powder; mix thoroughly the microbial powder of photosynthetic bacteria, producing anaerobic composite microbial powder bacteria.

2) Mix the proliferation promoting agents (glucose and fructooligosaccharides in a mass ration of 1:1) thoroughly and respectively with the composite microbial powder characterizing in aerobic bacteria, facultative anaerobic bacteria or anaerobic bacteria.

3) Divide the mixture from step 2) and the proliferation promoting agents alone into three portions respectively, and sequentially embed in shellac gum and maltodextrin. There are three embedding layers, the thicknesses of which are 2 μm, 50 μm and 200 μm respectively, producing respectively aerobic composite microbial agents, facultative anaerobic composite microbial agents, anaerobic composite microbial agents and proliferation promoting agents with modified-release property 4) Add the composite microbial agents and proliferation promoting agents from step 3) to the protective shell containing protective agents (starch and sodium alginate in a mass ration of 1:1), producing the filtration enhancement device in a circulating water culture system characterizing in aerobic bacteria, facultative anaerobic bacteria or anaerobic bacteria.

5) Fix the filtration enhancement device characterizing in aerobic bacteria, facultative anaerobic bacteria or anaerobic bacteria to their corresponding locations according to the internal circumstance of the filter in circulating water culture system.

Embodiment 9

The filtration enhancement device applied to a recirculating aquaculture system includes four components: protective shell, protective agents, microbial powder, and proliferation promoting agents.

The protective shell comprises a shell, an extension cord is attached to the protective shell, and a fixing component is attached to the extension cord.

The protective shell is made of mesh filters.

The fixing component contains a hole and self-adhesives.

The protective agents are sodium carboxymethyl cellulose and starch.

The microbial powder includes the *Actinomyces*, yeast, nitrifying bacteria, nitrosated bacteria, lactic acid bacteria, photosynthetic bacteria and denitrifying bacteria.

The proliferation promoting agents are skim milk and peptone.

The timed-release layer is made of sodium alginate and modified starch.

The method for preparing the above-stated filtration enhancement device in circulating water culture system comprises the below steps:

1) Mix thoroughly the microbial powder of the Actinomycetes, yeast, nitrifying bacteria, nitrosated bacteria, producing aerobic composite microbial powder; mix thoroughly the microbial powder of lactic acid bacteria, producing facultative anaerobic composite microbial powder; mix thoroughly the microbial powder of photosynthetic bacteria and denitrifying bacteria, producing anaerobic composite microbial powder bacteria.

2) Mix the proliferation promoting agents (skim milk and peptone in a mass ration of 1:1) thoroughly and respectively with the composite microbial powder characterizing in aerobic bacteria, facultative anaerobic bacteria or anaerobic bacteria.

3) Divide the mixture from step 2) and the proliferation promoting agents alone into three portions respectively, and sequentially embed in sodium alginate and modified starch. There are three embedding layers, the thicknesses of which are 1 μm, 60 μm and 180 μm respectively, producing respectively aerobic composite microbial agents, facultative anaerobic composite microbial agents, anaerobic composite microbial agents and proliferation promoting agents with modified-release property 4) Add the composite microbial agents and proliferation promoting agents from step 3) to the protective shell containing protective agents (sodium carboxymethyl cellulose and starch in a mass ration of 1:1), producing the filtration enhancement device in circulating water culture system characterizing in aerobic bacteria, facultative anaerobic bacteria or anaerobic bacteria.

5) Fix the filtration enhancement device characterizing in aerobic bacteria, facultative anaerobic bacteria or anaerobic bacteria to their corresponding locations according to the internal circumstance of the filter in a circulating water culture system.

In order to test the effect of the filtration enhancement device of the present disclosure on the filtration system in a circulating water culture system, the following experiment was conducted.

Five groups of aquarium with filters are selected. Each aquarium keeps three healthy koi with the body length ranged from 20 to 25 centimeters, which are provided with the same amount of feeds daily. The five experiment groups are set as the following treatments respectively:

Experiment Group 1: no treatment was applied;

Experiment Group 2: the filtration enhancement device of Embodiment 1 was applied;

Experiment Group 3: the commercial powdered microbial agents for water purification was applied.

Experiment Group 4: the commercial liquid microbial agents for water purification was applied.

Experiment Group 5: the commercial microbial agents for water purification with modified-release property was applied;

The experiment results demonstrated that in Experimental Group 1, the concentrations of ammonia nitrogen, and nitrate continued to increase in water during the experiment. In Experimental Group 2, 3, 4 and 5, the concentrations of ammonia nitrogen, nitrite and nitrate dropped relative to Experiment Group 1. However, as time passed by and water conditions diluted the microbial agents, the concentrations of the pollutants began to rise slowly, indicating that the lifespans of such products are shorter and need to be repeatedly applied, which not only causes inconvenience but also increased maintenance costs. Though the product in Experimental Group 5 featured some modified-release properties, which made its purification capacity better than those of Experimental Group 3 and 4, the concentrations of ammonia nitrogen, nitrite and nitrate still rose after 30 days due to the dilution effect of the water and reapplication was required. In Experimental group 2, the water purification capacity remained at a high level throughout the experiment and the concentrations of ammonia nitrogen, nitrite and nitrate did not increase in any meaningful way nor to dangerous levels. Therefore, no further action, on the part of the user, is required over an extended period of time, which provides a great convenience, reduced expense and less waste or recyclable material.

REFERENCES CITED

U.S. Patent Documents

U.S. Pat. No. 5,011,679 A April 1991 Spanier et al.

Foreign Patents or Applications

101264985B July 2011 China Guo et al.
206232700U June 2017 China Lv et al.

What is claimed is:

1. A filtration enhancement device in a circulating water culture system, comprising the following components:
   microbial powder and proliferation promoting agents are mixed thoroughly according to a mass ratio of 1:1~10000, producing a microbial powder mixture; wherein the microbial powder mixture is embedded in timed-release layers of different thicknesses according to an expected release time, wherein the timed-release layers contains one or more layers, and the thickness of each layer is 1 to 1000 μm;
   proliferation promoting agents, wherein the proliferation promoting agents are embedded in timed-release layers of different thicknesses, and the thickness of each timed-release layer is 1 to 1000 μm;
   protective agents; and
   protective shell, wherein the embedded microbial powder mixture and proliferation promoting agents are within the protective shell containing the protective agents, according to the a mass ratio of 1:1-10.

2. The device of claim 1, wherein the protective agents are enclosed in the interior of the protective shell with the thickness range from 2 to 2000 μm.

3. The device of claim 1, wherein the microbial powder is made of aerobic bacteria, facultative anaerobic bacteria, or anaerobic bacteria.

4. The device of claim 1, wherein the protective agents comprise any one or a combination selected from a group of sodium carboxymethyl cellulose, xanthan gum, shellac gum, sodium alginate, maltodextrin, starch, and soy protein.

5. The device of claim 1, wherein the materials of the protective shell comprises filtering papers, fabrics, or mesh filters.

6. The device of claim 1, wherein the proliferation promoting agents comprise any one or a combination selected from a group of skim milk, lactose, yeast extract, peptone, maltose, glucose, xylooligosaccharides, and fructooligosaccharides.

7. The device of claim 1, wherein materials used in the timed-release layers comprise any one or a combination selected from a group of sodium carboxymethylcellulose, xanthan gum, shellac gum, sodium alginate, maltodextrin, and modified starch.

8. The device of claim 1, wherein the device comprises a fixing component having a hole that can be affixed or suspended to a specific location in the circulating water culture system with self-adhesives.

9. A filtration device applied to a circulating water culture system with the device of claim 1 therein.

10. The device of claim 9, wherein
   a composition of microbial powder of the device is selected according to locations of deployment;
   aerobic bacteria are a main composition in anterior segments of the device;
   facultative anaerobic bacteria are a main composition in middle segments of the device;
   anaerobic bacteria are a main composition in posterior segments of the device.

11. A method for preparing a filtration enhancement device in a circulating water culture system, wherein the device comprises protective shell, protective agents, microbial powder, and proliferation promoting agents, wherein the method comprises:
   1) mixing the microbial powder and proliferation promoting agents thoroughly according to a mass ratio of 1:1~10000, producing microbial powder mixture;
   2) embedding the microbial powder mixture in timed-release layers of different thicknesses according to expected release time; wherein the thickness of each layer is 1 to 1000 μm;
   3) embedding the proliferation promoting agents in the timed-release layers;
   4) adding the embedded microbial powder mixture and proliferation promoting agents according to a mass ratio of 1:1-10 to the protective shell containing protective agents, producing the filtration enhancement device circulating water culture system.

12. The method of claim 11, wherein the protective agents are enclosed in an interior of the protective shell with a thickness range from 2 to 2000 μm.

13. The method of claim 11, wherein the microbial powder is made of aerobic bacteria, facultative anaerobic bacteria, or anaerobic bacteria.

14. The method of claim 11, wherein the protective agents comprise any one or a combination selected from a group of sodium carboxymethyl cellulose, xanthan gum, shellac gum, sodium alginate, maltodextrin, starch, and soy protein.

15. The method of claim 11, wherein the materials of the protective shell comprises filtering papers, fabrics, or mesh filters.

16. The method of claim 11, wherein the proliferation promoting agents comprise any one or a combination selected from a group of skim milk, lactose, yeast extract, peptone, maltose, glucose, xylooligosaccharides, and fructooligosaccharides.

17. The method of claim 11, wherein materials used in the timed-release layers comprise any one or a combination selected from a group of sodium carboxymethylcellulose, xanthan gum, shellac gum, sodium alginate, maltodextrin, and modified starch.

18. The method of claim 11, wherein the device comprises a fixing component having a hole that can be affixed or suspended to a specific location in the recirculating water culture system with self-adhesives.

* * * * *